(12) United States Patent
Robichaud et al.

(10) Patent No.: US 10,825,458 B2
(45) Date of Patent: Nov. 3, 2020

(54) SYSTEMS AND METHODS FOR A TWO PASS DIARIZATION, AUTOMATIC SPEECH RECOGNITION, AND TRANSCRIPT GENERATION

(71) Applicant: Rev.com, Inc., San Francisco, CA (US)

(72) Inventors: Jean-Philippe Robichaud, Mercier (CA); Alexei Skurikhin, Redwood City, CA (US); Migüel Jetté, Squamish (CA); Petrov Evgeny Stanislavovich, Saint Petersburg (RU)

(73) Assignee: REV.COM, INC., San Francisco, CA (US)

( * ) Notice: Subject to any disclaimer, the term of this patent is extended or adjusted under 35 U.S.C. 154(b) by 78 days.

(21) Appl. No.: 16/177,061

(22) Filed: Oct. 31, 2018

(65) Prior Publication Data

US 2020/0135204 A1 Apr. 30, 2020

(51) Int. Cl.

| | |
|---|---|
| *G10L 15/00* | (2013.01) |
| *G10L 15/26* | (2006.01) |
| *G10L 19/038* | (2013.01) |
| *G10L 17/00* | (2013.01) |
| G10L 15/22 | (2006.01) |
| G10L 15/30 | (2013.01) |

(52) U.S. Cl.
CPC .............. *G10L 15/26* (2013.01); *G10L 17/00* (2013.01); *G10L 19/038* (2013.01); *G10L 15/22* (2013.01); *G10L 15/30* (2013.01)

(58) Field of Classification Search
CPC combination set(s) only.
See application file for complete search history.

(56) References Cited

U.S. PATENT DOCUMENTS

| | | |
|---|---|---|
| 2011/0302489 A1 | 12/2011 | Zimmerman |
| 2012/0059656 A1 | 3/2012 | Garland et al. |
| 2013/0166285 A1 | 6/2013 | Chang et al. |
| 2014/0074467 A1 | 3/2014 | Ziv et al. |
| 2016/0217792 A1* | 7/2016 | Gorodetski ............. G10L 17/04 |
| 2016/0283185 A1 | 9/2016 | McLaren et al. |
| 2017/0372706 A1 | 12/2017 | Shepstone et al. |

OTHER PUBLICATIONS

International Search Report and Written Opinion dated Mar. 3, 2020 issued in related PCT App. No. PCT/US19/58870 (19 pages).

* cited by examiner

*Primary Examiner* — Vu B Hang
(74) *Attorney, Agent, or Firm* — Haynes and Boone, LLP

(57) ABSTRACT

In one embodiment, a method for transcript generation includes receiving an audio file and dividing it into a plurality of chunks. The method further includes sending each instance of the plurality of chunks to a speech service module. The method further includes converting speech to text for each instance of the plurality of chunks and returning the text for each instance of the plurality of chunks. The method further includes merging the text for each instance of the plurality of chunks to yield an audio file transcript and sending the audio file and chunks to a diarization module. The method further includes performing first pass diarization on the chunks to yield a plurality of diarized chunks and performing second pass diarization on the plurality of diarized chunks and the audio file to yield a diarized audio file. The method further includes merging the files to yield a final transcript.

20 Claims, 5 Drawing Sheets

SYSTEMS AND METHODS FOR A TWO PASS DIARIZATION, AUTOMATIC SPEECH RECOGNITION, AND TRANSCRIPT GENERATION

BACKGROUND

Speech recognition and the creation of transcripts or closed captions is a desirable task to partially or completely perform via computing system. In order to perform such tasks, speakers must be identified and partitioned. This is referred to as diarization. Such processing to perform diarization may be intensive in relation to the time and processing power required. The more complex and long the sound signal, in relation to the number of speakers, the shortness of utterances, and the length of the signal, the long this process may take. In many scenarios, consumers desire more rapid processing and transcript generation.

BRIEF SUMMARY

In one embodiment, a method for transcript generation including ASR and diarization includes receiving an audio file at a platform module and dividing the audio file into a plurality of chunks. The method further includes sending each instance of the plurality of chunks to a speech service module. The method further includes converting speech to text for each instance of the plurality of chunks. The method further includes returning the text for each instance of the plurality of chunks to the platform module. The method further includes merging the text for each instance of the plurality of chunks at the platform module to yield an audio file transcript. The method further includes sending the audio file and the plurality of chunks to a diarization module. The method further includes performing first pass diarization on the plurality of chunks to yield a plurality of diarized chunks. The method further includes performing second pass diarization on the plurality of diarized chunks and the audio file to yield a diarized audio file. The method further includes merging the audio file transcript and the diarized audio file to yield a final transcript. In one alternative, the first pass diarization occurs at the same time as the converting text to speech. In one alternative, the method further includes transcoding the audio file to a known codec. In another alternative, the method further includes sending the audio file transcript to a post process module and applying punctuation and casing to the audio file transcript. Alternatively, the plurality of diarized chunks includes a plurality of segments, each with speaker identification information. In another alternative, the speaker identification information is an I-vector. Alternatively, in each of the plurality of diarized chunks, segments of the plurality of segments which include statistically similar speaker identification information are clustered as belonging to a corresponding speaker of a plurality of speakers. In another alternative, the second pass diarization includes giving each of the plurality of speakers for each of the plurality of diarized chunks a unique identifier. In another alternative, the second pass diarization includes, for associated segments of the plurality of segments for each unique identifier, averaging the speaker identification information of the associated segments to yield averaged speaker identification information. Alternatively, the second pass diarization includes, assigning identified segments of the plurality of segments from all of the plurality of chunks a final speaker based on correlation between the averaged speaker identification information for the associated segments of the plurality of segments for each unique identifier. In another alternative, the method further includes outputting the final transcript in a fixed and tangible format.

In one embodiment, a system for transcript generation including ASR and diarization includes a platform module, a speech service module in communication with the platform module, and a diarization module in communication with the platform module. The platform module, the speech service module, and speech service module are configured to receive an audio file at the platform module and divide the audio file into a plurality of chunks. The platform module, the speech service module, and speech service module are further configured to send each instance of the plurality of chunks to the speech service module. The platform module, the speech service module, and speech service module are further configured to convert speech to text for each instance of the plurality of chunks. The platform module, the speech service module, and speech service module are further configured to return the text for each instance of the plurality of chunks to the platform module. The platform module, the speech service module, and speech service module are further configured to merge the text for each instance of the plurality of chunks at the platform module to yield an audio file transcript. The platform module, the speech service module, and speech service module are further configured to send the audio file and the plurality of chunks to the diarization module. The platform module, the speech service module, and speech service module are further configured to perform first pass diarization on the plurality of chunks to yield a plurality of diarized chunks. The platform module, the speech service module, and speech service module are further configured to perform second pass diarization on the plurality of diarized chunks and the audio file to yield a diarized audio file. The platform module, the speech service module, and speech service module are further configured to merge the audio file transcript and the diarized audio file to yield a final transcript. Alternatively, the platform module, the speech service module, and speech service module are further configured to transcode the audio file to a known codec. In one alternative, the system further includes a post process module and the post process module, the platform module, the speech service module, and speech service module are further configured to send the audio file transcript to a post process module; and apply punctuation and casing to the audio file transcript. Alternatively, the plurality of diarized chunks includes a plurality of segments, each with speaker identification information. In another alternative, the speaker identification information is an I-vector. Alternatively, in each of the plurality of diarized chunks, segments of the plurality of segments which include statistically similar speaker identification information are clustered as belonging to a corresponding speaker of a plurality of speakers. In another alternative, the second pass diarization includes giving each of the plurality of speakers for each of the plurality of diarized chunks a unique identifier. In another alternative, the second pass diarization includes, for associated segments of the plurality of segments for each unique identifier, averaging the speaker identification information of the associated segments to yield averaged speaker identification information. Alternatively, the second pass diarization includes, assigning identified segments of the plurality of segments from all of the plurality of chunks a final speaker based on correlation between the averaged speaker identification information for the associated segments of the plurality of segments for each unique identifier.

In one embodiment, a method of performing diarization on a sound recording includes receiving a sound recording and breaking the sound recording into a plurality of chunks. The method further includes performing a first diarization on the plurality of chunks, wherein the performing includes breaking each of the plurality of chunks into a plurality of segments, for each of the plurality of segments generating statistical speaker information descriptive of the sound characteristics in that segment, and clustering, within each chunk of the plurality of chunks, segments having similar statistical speaker information to generate within each chunk of the plurality of chunks groups of segments grouped according to the similar statistical speaker information. The method further includes performing a second diarization over the first diarization by clustering between the plurality of chunks, the groups of segments according to grouped similar statistical speaker information, the grouped similar statistical speaker information being characteristics of speech of each group for the groups of segments.

In one embodiment, a fixed tangible medium, which when executed by a computing system, executes steps including receiving an audio file at a platform module and dividing the audio file into a plurality of chunks. The steps further include sending each instance of the plurality of chunks to a speech service module. The steps further include converting speech to text for each instance of the plurality of chunks. The steps further include returning the text for each instance of the plurality of chunks to the platform module. steps further include merging the text for each instance of the plurality of chunks at the platform module to yield an audio file transcript. The steps further include sending the audio file and the plurality of chunks to a diarization module. The steps further include performing first pass diarization on the plurality of chunks to yield a plurality of diarized chunks. The steps further include performing second pass diarization on the plurality of diarized chunks and the audio file to yield a diarized audio file. The steps further include merging the audio file transcript and the diarized audio file to yield a final transcript.

DETAILED DESCRIPTION

Certain terminology is used herein for convenience only and is not to be taken as a limitation on the embodiments of the systems and methods for segmented diarization for the purpose of closed captioning or transcript creation. In many embodiments, an audio recording is received by a system that processes the audio recording in order to determine the contents of the recording and the identification of speakers in the recording. In many embodiments, the recording is divided into chunks that are processed in parallel and them combined at the completion of processing. In many embodiments, the recording is processed first for speech recognition. Then the recording is processed for diarization in a chunk format. The chunks for diarization are typically the same for the speech recognition. Subsequently, in many embodiments the recording is recombined and punctuation and text formatting is added. In many embodiments, the time required for diarization may be maintained relatively constant, since all of the chunks are processed in parallel.

Figure 4:
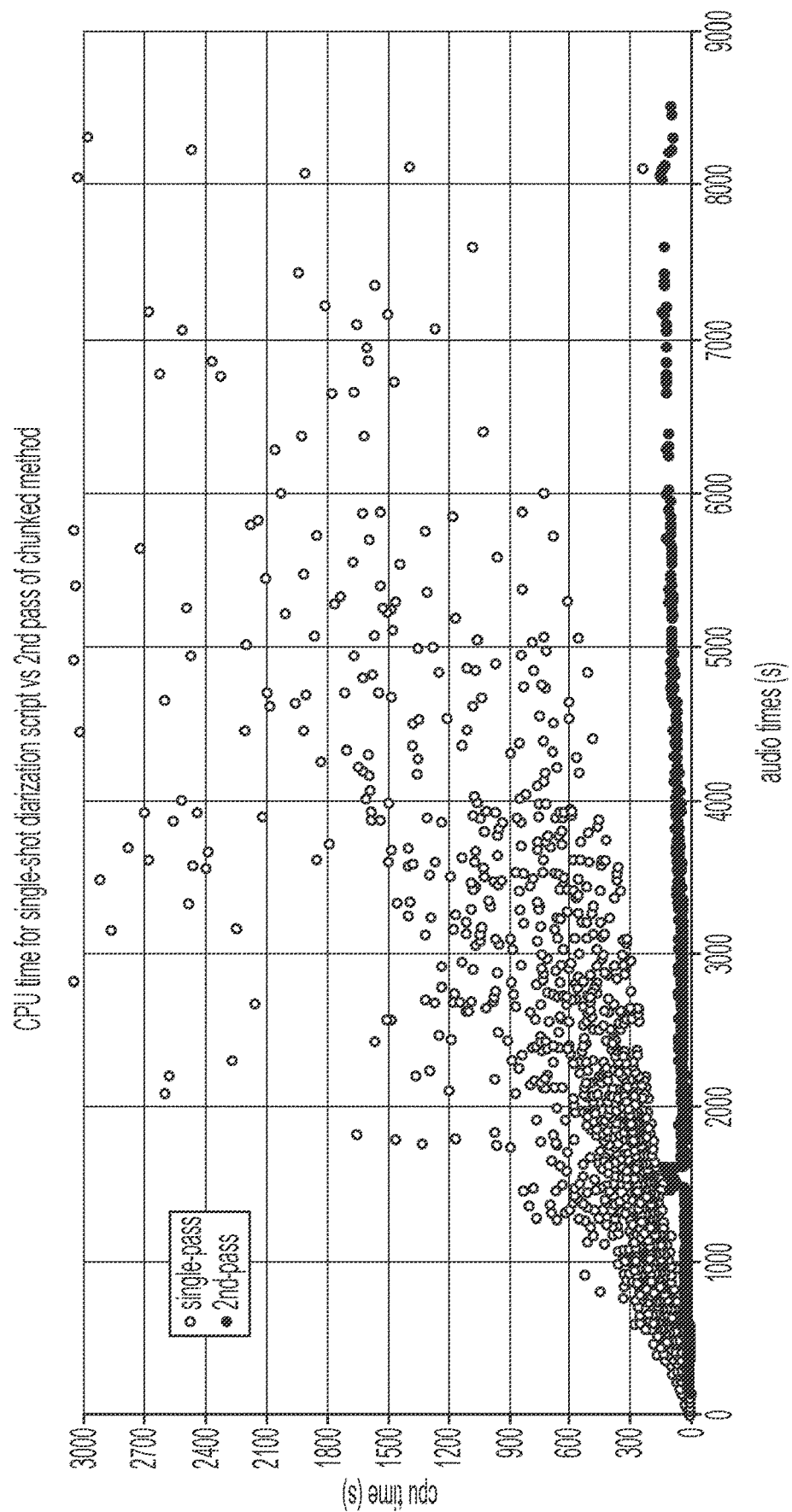
FIG. 4 shows a chart comparing CPU time vs audio length for single-pass vs 2-passes diarization for the time comparisons.

Diarization is the task of finding who spoke when across an audio track. This may involve clustering techniques such as Normalized Cross Likelihood Ratio (NCLR) and may include gathering statistics across the entire audio stream in an iterative fashion. While this gives a good accuracy, the major drawback is that as the audio length increases, the amount of CPU time required to perform the operation can increase in a non-linear fashion and dramatically increase the turnaround time for delivering the final results to the end user. This is especially the case when 2 or more speakers are interacting quickly, providing many smaller speech segments interleaving each other. See FIG. 4, which shows a chart comparing CPU time vs audio length for single-pass vs 2-passes diarization for the time comparisons.

In one embodiment, since our turnaround time is important, the time spent performing the diarization of the entire audio file is reduced.

A system performing a single pass diarization might be as follows. The processing pipeline may be done in 3 major parts:

1. the chunked-mode spoken text recognition;
2. a diarization pipeline running on the entire audio file (that was running in parallel while #1 was also being performed);
3. a post-processing stage to add punctuation, text formatting, etc. that started only once #1 and #2 had completed.

In part 1, batch processing of the audio for spoken text recognition works by first splitting the original audio file in chunks of 3 minutes and performing, for each of these chunks, a diarization process to know identify which part of these 3 minutes, if possible, to whom belong each of these speech chunks. Then the ASR (automatic speech recognition) is performing on the chunks identified as "speech", grouped by "speaker" as identified by the diarization pipeline.

The fact that stage #2 could take a long time compared to #1 makes this system less desirable, since the whole turnaround time very long and somewhat unpredictable.

In the literature, diarization algorithm speed is rarely discussed. The only way proposed to speedup diarization is to have faster algorithms (like I-vector) and or the usage of less statistics (like binary keys).

In the industry, there is either no special handling of this problem (turnaround time is long). Furthermore, it is not a simple process to combine chunks that are done in parallel, without some further consideration and previously unknown techniques.

In various parts of this disclosure, the term "chunk" is used. Other words used may include "segment." In many embodiments, chuck refers to a window of a certain size somewhere inside an audio file. Various length chunks are possible and various configurations are possible for how to break chunks up. It may be done merely on a recording length basis or may be done on the basis of various other possibilities, such as the end of utterances, pauses in conversation, etc. The formation of chunks is not intended to be limited to any one technique.

In various parts of this disclosure, the term "segment" is used. Segment refers to a portion of an audio of an undetermined length that is believed to belong to a specific speaker and contains a signal representative of speech.

In various parts of this disclosure, the term "cluster" is used. Cluster refers to an ensemble of all segments belonging to the same (alleged) speaker. In other words, a cluster is a collection of segments that are believed, according to the statistical and algorithmic processing technique of the system to belong to the same speaker.

Figure 1:
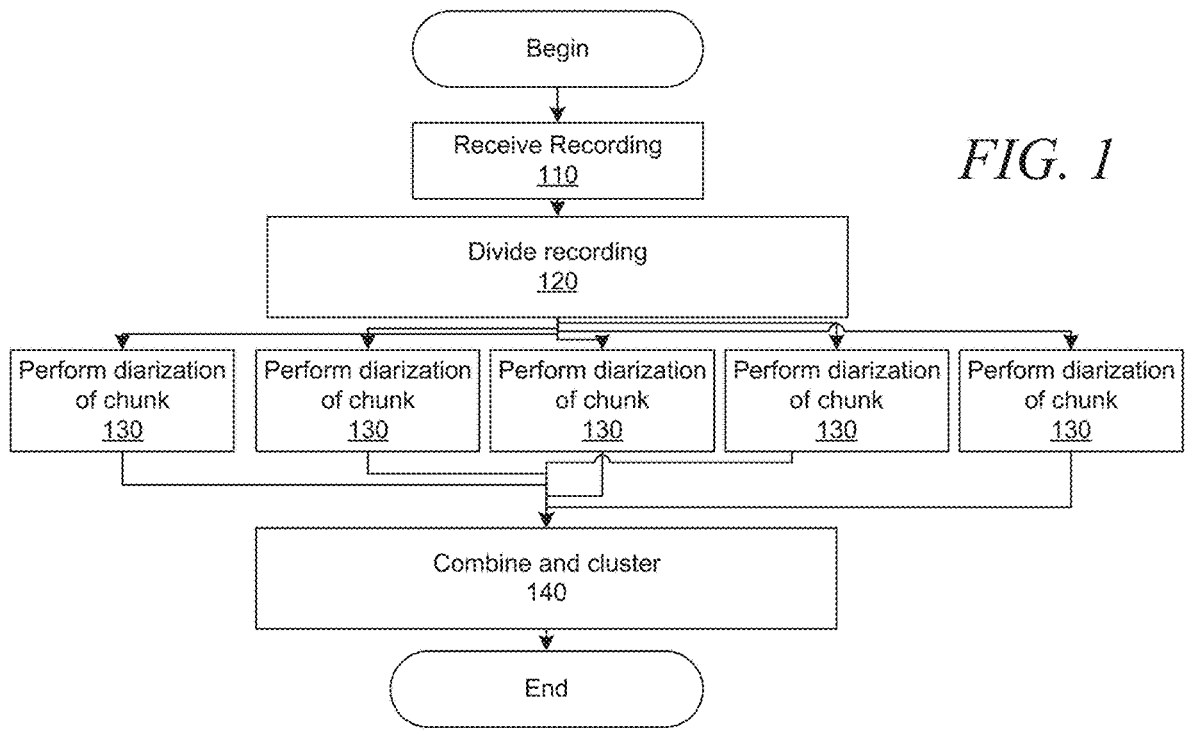
FIG. 1 depicts a flowchart of one embodiment of a method of two pass diarization.

FIG. 1 depicts a flowchart of one embodiment of a method of two pass diarization. In step 110, the system receives a recording. In step 120, the recording is divided into chunks. Various size chunks may be used as described herein. This divisions of the recording provides for the simultaneous processing of the chunks. In step 130 the chunks are simultaneously processed. In this step diarization is performed. In other words, for each segment of each chunk, a speaker is assigned based on the characteristics of the sound of that segment. In step 140, the chunks including the speaker identification information are recombined. As part of this recombination process the segments of the chunks are clustered according to speaker identification statistics and information. In other words, segments having a known speaker in one chunk are compared to segments in all other chunks. Those chunks that are that have statistically similar speaker information are clustered and considered to be the same speaker.

Below can be found the pseudo-code of the critical part of the Diarization Service self-loop: New 2-pass diarization ASR transcription. This particular pseudo code is exemplary and numerous alternative exist.

Figure 2A:
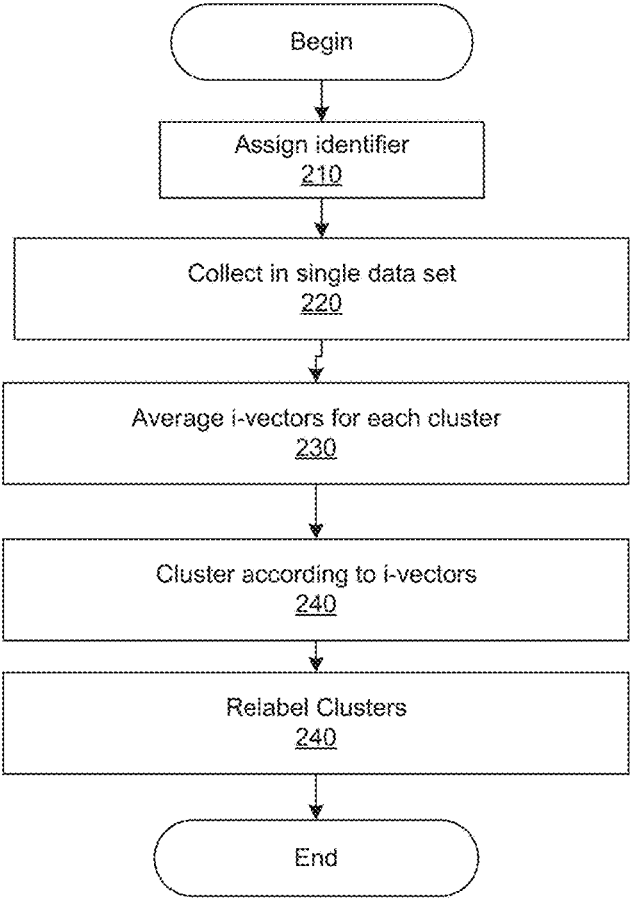
FIG. 2A shows one embodiment of a flow chart for pseudo code.

For each chunk diarization result:
  assign each detected speaker a unique name across all chunks
Merge all chunk diarization results into one single diarization manifest
For each cluster in that manifest
  Get an I-vector mean for each cluster
Perform I-vector clustering using ILP linear optimization
Relabel all segments according to the obtained speaker mapping FIG. 2A shows a flow chart explaining the pseudo code. The process described in FIG. 2A and the pseudo code above, operates subsequent to the diarization of all of the chunks. In step 210, a unique identifier is assigned to each speaker in a chunk. Practically, this is important, since each chunk is diarizated separately, the default name given to each cluster may overlap between chunks. After this is completed, in step 220, the renamed chunks are each collected in a single dataset as if they had resulted from a diarization of a single long audio recording. During the diarization process, I-vectors are for each segment of a chunk. Subsequently, segments having statistically similar I-vectors are grouped to form a cluster. In step 230, the I-vectors of each segment in a cluster are averaged, to create an I-vector representative of that cluster. Then each I-vector mean for each cluster is used to cluster the clusters. This is performed using ILP linear optimization. Alternative, statistical techniques may be used in order to cluster the clusters. Once the clusters are clustered, in step 250, the segments are all relabeled accordingly. Thusly, the clusters belonging to a speaker have been grouped and identified as belonging to a single speaker. Although this logic is explained in relation to the use of I-vectors other techniques may be used to determine speakers and practice the above techniques.

The above logic allows for the diarization of any audio file to be performed in almost a constant time, which is a dramatic advantage over any other techniques known right now. The accuracy lost using this technique is negligible and the speed increase is dramatic for any audio file length matching the distribution typical of such a production system. This is just an example of one possible logic. Many embodiments rely on conducting a first and second pass diarization. In such embodiments, chunks of the recording are first produced. Then a first pass diarization processes the chunks to determine information concerning what segments of the chunks belong to speakers identified in the chunks. Then, the various speakers identified in the chunks are analyzed together in order to match speakers between the chunks. Thusly, diarization may be accomplished for the entire recording by performing diarization on the chunks and then diarization between the chunks.

Figure 2B:
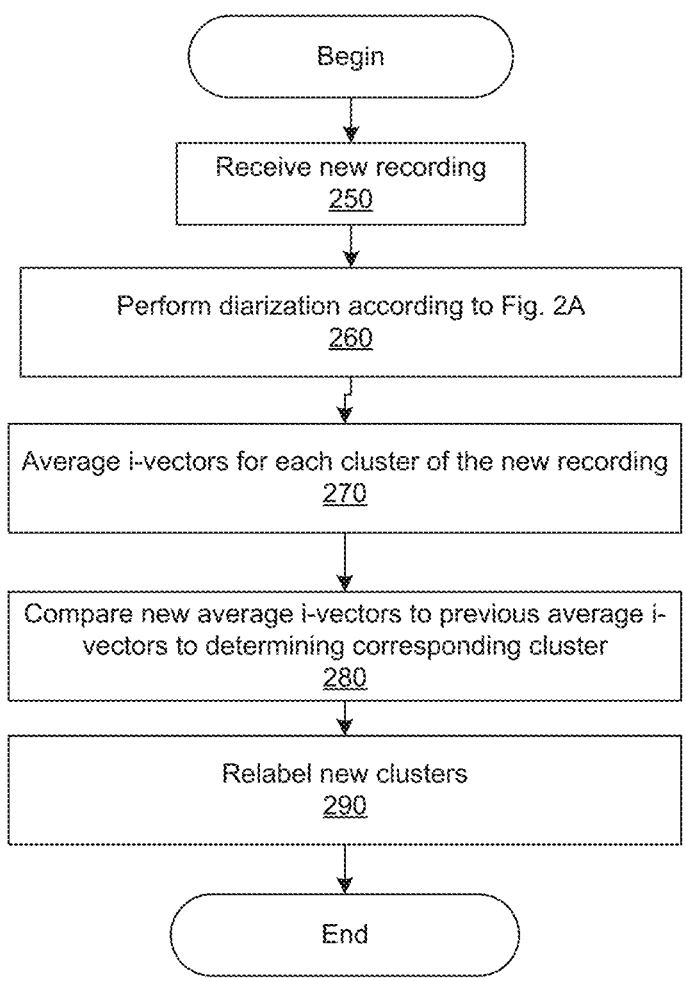
FIG. 2B shows one embodiment of a flow chart for continued processing according to previous clustering.

In the case when the audio file is actually being streamed by the user instead of being already available entirely for the system to process, the current technique can still be applied, and new chunks can be processed in the context of the previous chunks easily without having to perform again the previous chunks. The 2nd pass diarization steps are simply run again including the information from the new chunk. FIG. 2B shows one embodiment of a flow chart for continued processing according to previous clustering. The method described in FIG. 2B in many configurations functions as an add on to the method described in relation to FIG. 2A. In other words, after an initial two pass diarization occurs, an additional two step diarization can occur. In step 250 a new recording is received corresponding to the previous recording that has been analyzed. In step 260 diarization is then performed on the new recording according to the method of FIG. 2A. Average i-vectors are then created for the new clusters in step 270. In step 280 the average i-vectors for the new recording are compared to the average i-vectors for the old clusters. Then the clusters for the new recording are relabeled as belonging to the corresponding cluster of the old clusters, if such a correlation/match exists in step 290. Note that at such point a new i-vector may be generated for the regrouped clusters. In an alternative, a completely new grouping may occur according to a method of FIG. 2A where all the data is collected in a single set and then regrouped. Also, although this and many other methods discuss i-vectors, any type of representation of the characteristics of a group of chunks may be used.

Figure 3A:
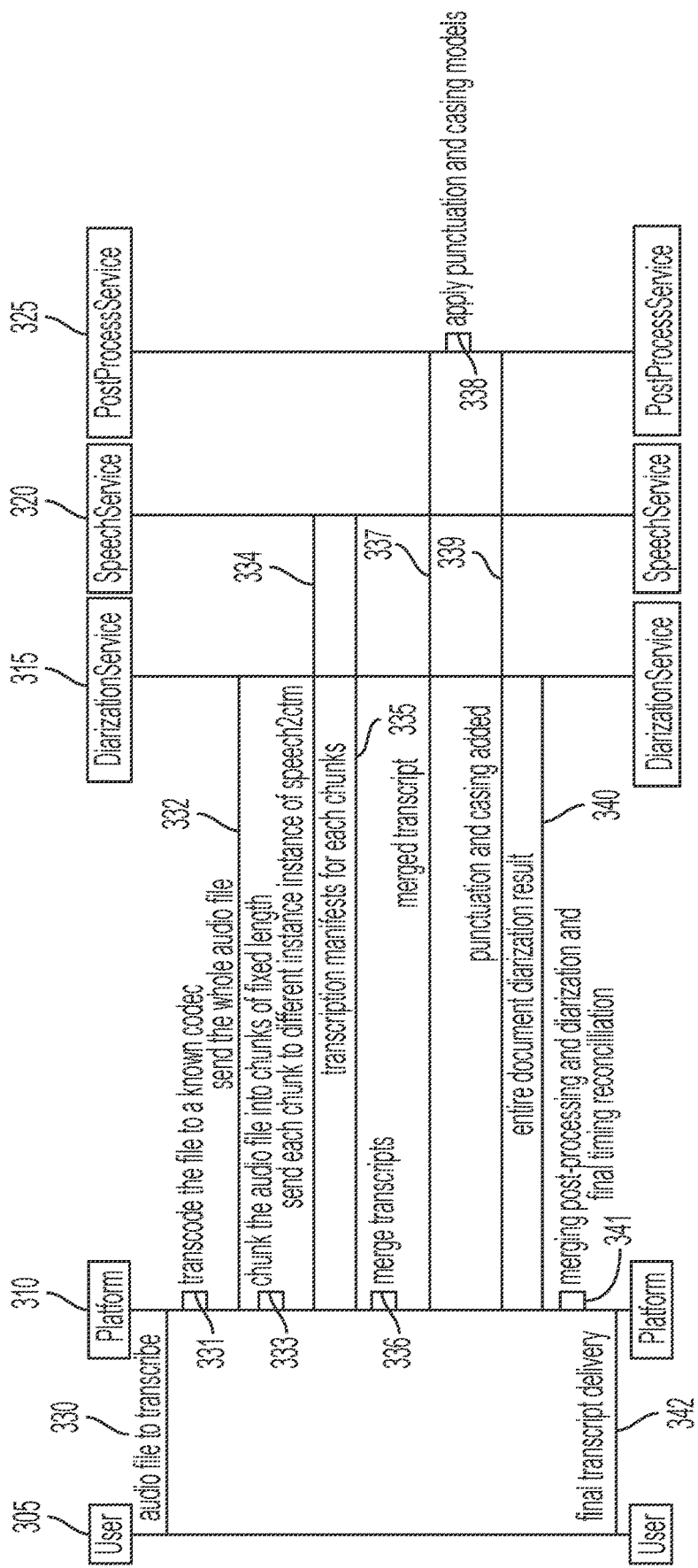
FIG. 3A shows one embodiment of a system using a technique for diarization only including one pass.

FIG. 3A shows one embodiment of a system using a technique for diarization only including one pass. This highlights the advantage provide by the complete system. The representation of FIG. 3A may be referred to as a sequence diagram. Such technique typically has processing times that increase somewhat linearly with the length of recording. Such a system provides for a single pass. As shown, user 305 provides an audio file communicates with platform 310 by providing an audio file for transcription 330. In the diagram, the user may include a person using a computer or other computing device, like a smart phone. Typically, platform 310 is a computer or system of computers designed to receive requests from users. Alternatively, it may be a module within a computing system. It may be a virtualized computer or simply part of an overall codebase. There are many possible representations of this interaction that will be apparent to one of ordinary skill in the art in light of this disclosure. In many scenarios that format of the audio file may not be in a usage format so optionally a codex may be applied in step 331. Subsequently, platform 310 may send the audio file in step 332 to the diarization service 315. The diarization service may thereby identify speakers according to a single pass. In some alternatives, the platform 310 may then send the entire recording to speech service 320 for speech to text analysis. In the embodiment show, the platform 310 first divides the audio sample into chunks in step 333. Then the platform 310 send the chunks to the speech service 320 in step 334. As indicated, this is done such that each chunk is a different instance that may be processed simultaneously by speech service 320 or at least to the extent that the capacity of speech service 320 allows. The transcripts are provided back to the platform in step 335. In step 336 the transcripts are merged. Then the transcripts may be sent to post processing services 325 in step 337. Post processing services 325 may then apply punctuation and casing or other refinements of the text in step 338. The transcript with punctuation and casing is returned in step 339. Since the rate limiting step in such a configuration is the diarization, in step 340 the diarization results are returned to platform 310. Merging of the diarization results and transcript occur in step 341 and then in step 342 the result is returned to user 305. As mentioned above, the constructs of the user 305, platform 310, diarization service 315, speech service 320, post processing 325 may be actual or virtual, in that they may actually be different platforms or may be modules or weakly delineated divisions in the code. Furthermore, it is possible to move steps conceptually between these constructs as well as the timing of many of the steps.

Figure 3B:
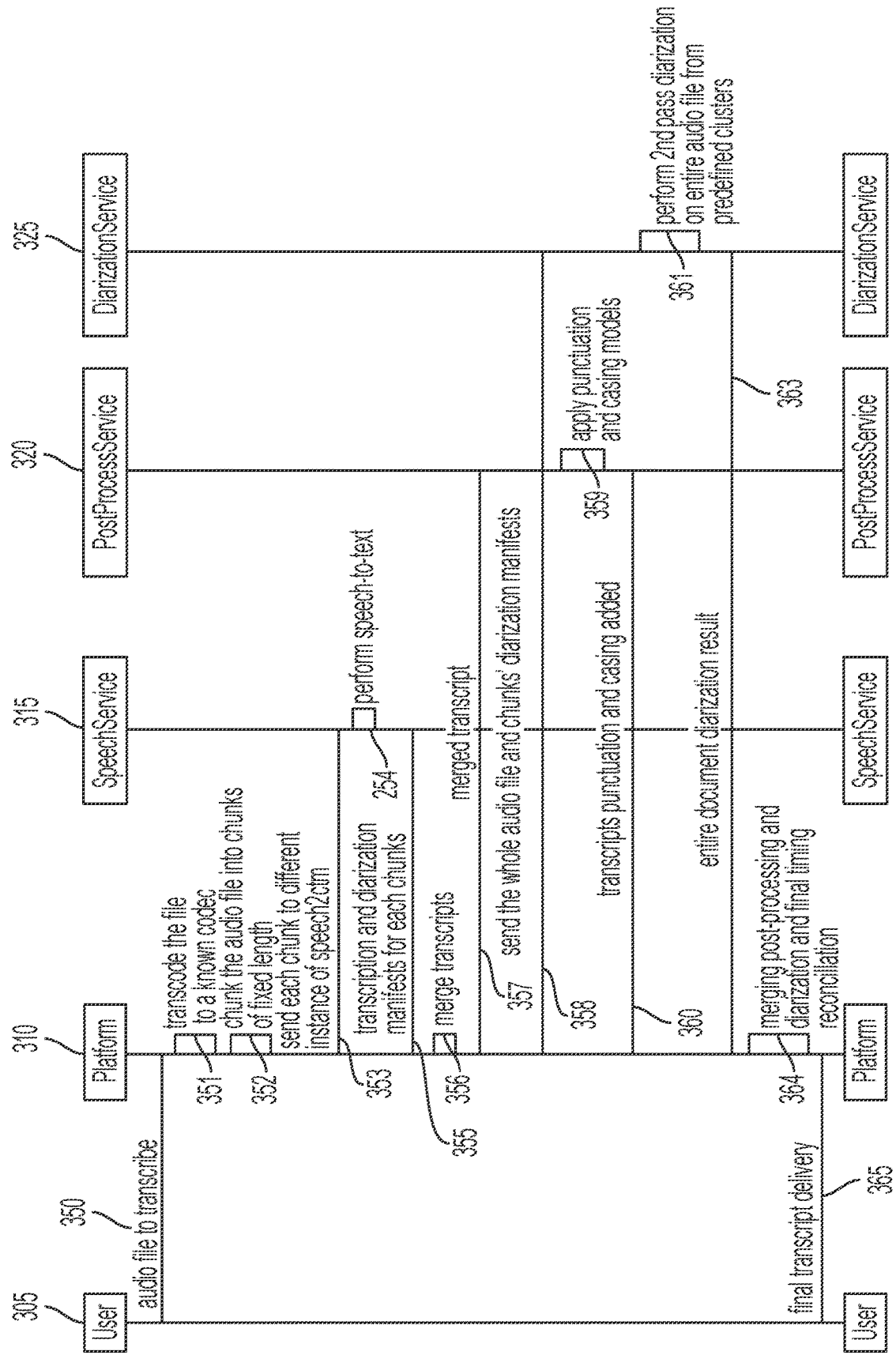
FIG. 3B shows one embodiment of a system utilizing simultaneous or concurrent diarization of a recording.

FIG. 3B shows one embodiment of a system utilizing simultaneous or concurrent diarization of a recording. As shown, user 305 provides an audio file communicates with platform 310 by providing an audio file for transcription 350. In the diagram, the user may include a person using a computer or other computing device, like a smart phone. Typically, platform 310 is a computer or system of computers designed to receive requests from users. Alternatively, it may be a module within a computing system. It may be a virtualized computer or simply part of an overall codebase. There are many possible representations of this interaction that will be apparent to one of ordinary skill in the art in light of this disclosure. In many scenarios that format of the audio file may not be in a usage format so optionally a codex may be applied in step 351. In step 352, the platform may device the audio file in to fixed length chunks. In some scenarios, the chunk length may vary, such as in scenarios where long periods of silence provide for strategic division or other factors that may contribute to scenarios where variable length is possible. Then the platform 310 send the chunks to the speech service 320 in step 353. As indicated, this is done such that each chunk is a different instance that may be processed simultaneously by speech service 320 in step 354 or at least to the extent that the capacity of speech service 320 allows. The transcripts are provided back to the platform in step 355. In step 356 the transcripts are merged. Then the transcripts may be sent to post processing services 325 in step 357. Then in step 358 the chunks and the whole audio file may be sent to the diarization service. The chunks are simultaneously processed as instances. During this post processing services 325 may then apply punctuation and casing or other refinements of the text in step 359. The transcript with punctuation and casing is returned in step 360. Subsequently, in step 361, the second pass diarization is performed. Then in step 363 the entire diarization result is returned. In step 364, everything is merged and in step 365, the transcript may be returned to the user. Some of the steps described herein may be performed in a different order. For instance, the diarization of chunks may be begin earlier in the processes, in some scenarios at the same time the speech to text occurs. As mentioned above, the constructs of the user 305, platform 310, diarization service 315, speech service 320, post processing 325 may be actual or virtual, in that they may actually be different platforms or may be modules or weakly delineated divisions in the code. Furthermore, it is possible to move steps conceptually between these constructs as well as the timing of many of the steps.

One aspect of the design of the system includes the formation of chunks of audio recordings. In many scenarios, it is desirable to design the system to create and operate on specific size chunks. Although embodiments may work on chunks of various lengths and the invention is not tied in many of its embodiments to a certain length chunk, some inventive aspects of the design include particular lengths of chunks. A concept behind creating chunks of specific lengths relates to the ability to process those chunks quickly and also have chunks that are long enough to provide for speaker identification. Although not absolute, in many scenarios, the length must be long enough for distinguishing characteristics of speech to be established. Usually, this means a chunk length of a couple of seconds will not be long enough to identify speakers. Additionally, a chunk length of an hour will be too long to process quickly and may result, for many audio recordings, in very few chunks. Therefore, it is a heuristic that the chunk length is on the order of several minutes. This is not absolute and merely a guideline. In some embodiments, a chunk length of about three minutes achieves a good balance between providing a chunk length that allows for quick processing, while at the same time providing for the ability to identify speakers. Essentially, it is a tradeoff between processing speed and having enough information to identify speakers and have valuable statistics concerning those speakers. In many embodiments, a chunk length from 1-15 minutes is appropriate. Again, this is only a guideline.

In one embodiment, chunks of 3 minutes (180 seconds) are used and it was determined that this provides the best speed/accuracy trade-offs for the whole ASR system. Decreasing the size of the chunks improve the overall throughput of the system (up to a certain point) where the fixed costs of initialization is getting prominent but also reduces the accuracy of diarization and ASR output. Increasing the chunk size improves ASR and diarization accuracy a bit but add to the turnaround time. The time taken by the diarization component increases in a non-linear fashion with the audio length. It can't be characterized precisely because it depends too much on the audio content but as can be seen in the graph already of FIG. 4, it becomes extremely large at times.

Generally, in the art, speaker recognition systems may use an I-vector like system consisting of at least three parts.

One part includes feature extraction. In many configurations, either MFCC (Mel-frequency cepstral coefficients) or PLP (Perceptual Linear Prediction) features are used in speaker recognition systems. In many configurations, this step creates a more compact and effective representation of speech samples by using frequency analysis techniques (e.g. FFT, fast fourier transform).

Another part includes I-vector extraction. Although this is referred to as I-vectors extraction, this may be related to any type of vector or any type of system that compares characteristics of a segment against a model or expected characteristics. The word I-vector relates to having a vector representation of the identity of the speaker: an I-vector or identity vector. According to an I-Vector model, an utterance model is created including the MFCC features. In many configurations, this may be done via Factor analysis, however other techniques may be possible. Under Factor analysis various order statistics are created for the features for a genericized model such as a generic Gaussian Mixture Model. The Gaussian Mixture Model may be a universal background model (UBM), however other models may be used. The I-vector describes how close a segment is to the UBM and based on this analysis, characteristics of a particular speaker in a segment may be developed. In other words, a model of what generic speech sounds like is developed and the sound of a particular segment are compared to this model and thereby characterized.

In order to compare I-vectors for two segments (or a set of segments) to determine whether they should be combined, I-Vector scoring is used as another part of speaker recognition. The step of vector scoring, or more specifically I-vector scoring, provides for a comparison of the "closeness" of two I-vectors based on a large set of examples. One scoring model is PLDA (Probabilistic linear discriminant analysis); it allows to use between- and within-speaker distributions to compute a "distance" (likelihood ratio) between two I-vectors. Some other possibilities include the use of a Hidden Markov Model (HMM) or a maximum likelihood Gaussian Mixture Model (or a minimum duration Gaussian Mixture Model).

The second pass diarization, in many configurations, may rely on a modified I-Vector scoring. In some such configurations, based on clustered segments for a particular speaker within each chunk, the I-vectors of such segments may be averaged and then compared to other averaged I-vectors. The closeness of two (or more) averaged I-vectors may be compared and then those I-Vectors and the segments corresponding thereto may be clustered.

In many embodiments, the system has advantages that include, the ability to perform the diarization of arbitrarily long audio files in a constant time, the procedure does not require to sacrifice accuracy for speed; it can leverage any speaker clustering technique for any stage of the diarization pipeline, and the system can be used in completely offline/batch mode or to semi-offline/streaming mode as well.

In one embodiment, a system for diarization of a sound recording includes a chunking module, the chunking module configured to create a plurality of chunks from a sound recording. The system further includes a first pass diarization module, the first pass diarization module receiving the plurality of chunks from the chunking module, the first pass diarization module configured to create a plurality of first pass diarization manifests, each of the plurality of first pass diarization manifests corresponding to a specific one of the plurality of chunks, the plurality of first pass diarization manifests including speaker identification information for segments of each of the plurality of chunks. The system further includes a second pass diarization module, the second pass diarization module receiving the plurality of first pass diarization manifests and using the speaker identification information for segments of each of the plurality of chunks to match speakers between the plurality of chunks to yield a unified speaker identification for the sound recording.

In one embodiment, a method for diarization of a sound recording includes receiving a sound recording and dividing the sound recording into a plurality of chunks at a chunking module. The method further includes processing each of the plurality of chunks at a first diarization module to yield a plurality of chunk manifests, each of the plurality of chunks corresponding to one of the plurality chunk manifests, each of the plurality of chunk manifests comprising a plurality of segments and an assigned speaker for each of the plurality of segments. The method further includes combining the plurality of chunk manifests to yield a plurality of sound recording segments, each of the plurality of sound recording segments including the assigned speaker. The method further includes identifying a final assigned speaker for each of the plurality of sound recording segments based on assigning a same In one embodiment, a method for determining the speaker includes dividing a sound recording into a plurality of chunks, each of the plurality of chunks having a plurality of speech segments. The method further includes, for each speech segments of the plurality of segments of each of the plurality of chunks, determining a speaker, thereby creating chunk speaker identification information for each chunk of the plurality of chunks. The method further includes combining the chunk speaker identification information for the plurality of chunks and determining for each speech segments of the plurality of segments of each of the plurality of chunks when a particular speech segment should be assigned a same speaker as another speech segment, thereby assigning the same speaker to a set of a plurality of segments based on correlating speakers.

In one embodiment, a method includes dividing a sound recording into a plurality of chunks, each of the plurality of chunks having a plurality of speech segments. The method further includes for each speech segments of the plurality of segments of each of the plurality of chunks, determining a speaker, thereby creating chunk speaker identification information for each chunk of the plurality of chunks. The method further includes, the chunk speaker identification information for the plurality of chunks and determining for each speech segments of the plurality of segments of each of the plurality of chunks when a particular speech segment should be assigned a same speaker as another speech segment, thereby assigning the same speaker to a set of a plurality of segments based on correlating speakers.

In one embodiment, a method for diarization of a sound recording includes receiving a sound recording and dividing the sound recording into a plurality of chunks. The method further includes diarizating the plurality of chunks to produce a plurality of diarizated chunks. The method further includes combining the plurality of diarizated chunks. The method further includes determining between the plurality of diarizated chunks, when a first speaker related to a first segment identified in a first chunk of the plurality diarizated chunks is statistically similar to a second speaker in a second segment in a second chunk of the plurality diarizated chunks, such that the first and second speaker are considered to be a same speaker and assigning a first segment in the first chunk of the plurality diarizated chunks and a second segment in the second chunk of the plurality diarizated chunks the same speaker.

In one embodiment, a method for diarization of a sound recording includes receiving a sound recording. The method further includes dividing the sound recording into a plurality of chunks. The method further includes diarizating the plurality of chunks to produce a plurality of diarizated chunks, the plurality of diarizated chunks each including a plurality of segments, each of the plurality of segments having an assigned speaker determined during the diarizating, the assigned speaker including a speaker identifier and statistical information concerning characteristics of the assigned speaker. The method further includes combining the plurality of diarizated chunks. The method further includes clustering a plurality of same speaker segments of the plurality of segments of the plurality of diarizated chunks, based on the assigned speaker for the plurality of same speaker segments having sufficient statistical similarity in the assigned speaker. The method further includes determining between the plurality of diarizated chunks, when a first speaker related to a first segment identified in a first chunk of the plurality diarizated chunks is statistically similar to a second speaker in a second segment in a second chunk of the plurality diarizated chunks, such that the first and second speaker are considered to be a same speaker and assigning a first segment in the first chunk of the plurality diarizated chunks and a second segment in the second chunk of the plurality diarizated chunks the same speaker.

In one embodiment, a method of determining speakers for a sound recording includes receiving a sound recording. The method further includes segmenting the sound recording into a first and second chunk. The method further includes diarizating the first and second chunk, wherein the diarizating includes breaking the first chunk into at least a first and second segment, determining that the first segment belongs to a first speaker and the second segment belongs to a second speaker and breaking the second chunk into at least a third and fourth segment, and determining that the third segment belongs to a third speaker and the fourth segment belongs to a fourth speaker. The method further includes combining the results of the diarizating, wherein the combining includes clustering the first segment and the third segment on the basis of the first speaker and the third speaker having statistically similar speech characteristics and assigning the first speaker and the third speaker to be the same speaker.

In one embodiment, a method of performing diarization on a sound recording includes receiving a sound recording and breaking the sound recording into a plurality of chunks. The method further includes performing a first diarization on the plurality of chunks, wherein the performing includes breaking each of the plurality of chunks into a plurality of segments, for each of the plurality of segments generating statistical speaker information descriptive of the sound characteristics in that segment, and clustering, within each chunk of the plurality of chunks, segments having similar statistical speaker information to generate within each chunk of the plurality of chunks groups of segments grouped according to the similar statistical speaker information. The method further includes performing a second diarization by clustering between the plurality of chunks, the groups of segments according to grouped similar statistical speaker information, the grouped similar statistical speaker information being characteristics of speech of each group for the groups of segments.

In one embodiment, a method for transcript generation including ASR and diarization includes receiving an audio file at a platform module and dividing the audio file into a plurality of chunks. The method further includes sending each instance of the plurality of chunks to a speech service module. The method further includes converting speech to text for each instance of the plurality of chunks. The method further includes returning the text for each instance of the plurality of chunks to the platform module. The method further includes merging the text for each instance of the plurality of chunks at the platform module to yield an audio file transcript. The method further includes sending the audio file and the plurality of chunks to a diarization module. The method further includes performing first pass diarization on the plurality of chunks to yield a plurality of diarized chunks. The method further includes performing second pass diarization on the plurality of diarized chunks and the audio file to yield a diarized audio file. The method further includes merging the audio file transcript and the diarized audio file to yield a final transcript. In one alternative, the method further includes transcoding the audio file to a known codec. In another alternative, the method further includes sending the audio file transcript to a post process module and applying punctuation and casing to the audio file transcript. Alternatively, the plurality of diarized chunks includes a plurality of segments, each with speaker identification information. In another alternative, the speaker identification information is an I-vector. Alternatively, in each of the plurality of diarized chunks, segments of the plurality of segments which include statistically similar speaker identification information are clustered as belonging to a corresponding speaker of a plurality of speakers. In another alternative, the second pass diarization includes giving each of the plurality of speakers for each of the plurality of diarized chunks a unique identifier. In another alternative, the second pass diarization includes, for associated segments of the plurality of segments for each unique identifier, averaging the speaker identification information of the associated segments to yield averaged speaker identification information. Alternatively, the second pass diarization includes, assigning identified segments of the plurality of segments from all of the plurality of chunks a final speaker based on correlation between the averaged speaker identification information for the associated segments of the plurality of segments for each unique identifier. In another alternative, the method further includes outputting the final transcript in a fixed and tangible format.

In one embodiment, a system for transcript generation including ASR and diarization includes a platform module, a speech service module in communication with the platform module, and a diarization module in communication with the platform module. The platform module, the speech service module, and speech service module are configured to receive an audio file at the platform module and divide the audio file into a plurality of chunks. The platform module, the speech service module, and speech service module are further configured to send each instance of the plurality of chunks to the speech service module. The platform module, the speech service module, and speech service module are further configured to convert speech to text for each instance of the plurality of chunks. The platform module, the speech service module, and speech service module are further configured to return the text for each instance of the plurality of chunks to the platform module. The platform module, the speech service module, and speech service module are further configured to merge the text for each instance of the plurality of chunks at the platform module to yield an audio file transcript. The platform module, the speech service module, and speech service module are further configured to send the audio file and the plurality of chunks to the diarization module. The platform module, the speech service module, and speech service module are further configured to perform first pass diarization on the plurality of chunks to yield a plurality of diarized chunks. The platform module, the speech service module, and speech service module are further configured to perform second pass diarization on the plurality of diarized chunks and the audio file to yield a diarized audio file. The platform module, the speech service module, and speech service module are further configured to merge the audio file transcript and the diarized audio file to yield a final transcript. Alternatively, the platform module, the speech service module, and speech service module are further configured to transcode the audio file to a known codec. In one alternative, the system further includes a post process module and the post process module, the platform module, the speech service module, and speech service module are further configured to send the audio file transcript to a post process module; and apply punctuation and casing to the audio file transcript. Alternatively, the plurality of diarized chunks includes a plurality of segments, each with speaker identification information. In another alternative, the speaker identification information is an I-vector. Alternatively, in each of the plurality of diarized chunks, segments of the plurality of segments which include statistically similar speaker identification information are clustered as belonging to a corresponding speaker of a plurality of speakers. In another alternative, the second pass diarization includes giving each of the plurality of speakers for each of the plurality of diarized chunks a unique identifier. In another alternative, the second pass diarization includes, for associated segments of the plurality of segments for each unique identifier, averaging the speaker identification information of the associated segments to yield averaged speaker identification information. Alternatively, the second pass diarization includes, assigning identified segments of the plurality of segments from all of the plurality of chunks a final speaker based on correlation between the averaged speaker identification information for the associated segments of the plurality of segments for each unique identifier.

In one embodiment, a fixed tangible medium, which when executed by a computing system, executes steps including receiving an audio file at a platform module and dividing the audio file into a plurality of chunks. The steps further include sending each instance of the plurality of chunks to a speech service module. The steps further include converting speech to text for each instance of the plurality of chunks. The steps further include returning the text for each instance of the plurality of chunks to the platform module. steps further include merging the text for each instance of the plurality of chunks at the platform module to yield an audio file transcript. The steps further include sending the audio file and the plurality of chunks to a diarization module. The steps further include performing first pass diarization on the plurality of chunks to yield a plurality of diarized chunks. The steps further include performing second pass diarization on the plurality of diarized chunks and the audio file to yield a diarized audio file. The steps further include merging the audio file transcript and the diarized audio file to yield a final transcript.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A method for transcript generation including ASR and diarization, the method comprising:
   receiving an audio file at a platform module;
   dividing the audio file into a plurality of chunks;
   sending each instance of the plurality of chunks to a speech service module;
   converting speech to text for each instance of the plurality of chunks;
   returning the text for each instance of the plurality of chunks to the platform module;
   merging the text for each instance of the plurality of chunks at the platform module to yield an audio file transcript;
   sending the audio file and the plurality of chunks to a diarization module;
   performing first pass diarization on the plurality of chunks to yield a plurality of diarized chunks;
   performing second pass diarization on the plurality of diarized chunks and the audio file to yield a diarized audio file;
   merging the audio file transcript and the diarized audio file to yield a final transcript.

2. The method of claim 1, further comprising:
   transcoding the audio file to a known codec.

3. The method of claim 1, further comprising:
   sending the audio file transcript to a post process module;
   applying punctuation and casing to the audio file transcript.

4. The method of claim 1, wherein the plurality of diarized chunks includes a plurality of segments, each with speaker identification information.

5. The method of claim 4, wherein the speaker identification information is an I-vector.

6. The method of claim 4, wherein in each of the plurality of diarized chunks, segments of the plurality of segments which include statistically similar speaker identification information are clustered as belonging to a corresponding speaker of a plurality of speakers.

7. The method of claim 6, wherein the second pass diarization includes giving each of the plurality of speakers for each of the plurality of diarized chunks a unique identifier.

8. The method of claim 7, wherein the second pass diarization includes, for associated segments of the plurality of segments for each unique identifier, averaging the speaker identification information of the associated segments to yield averaged speaker identification information.

9. The method of claim 8, wherein the second pass diarization includes, assigning identified segments of the plurality of segments from all of the plurality of chunks a final speaker based on correlation between the averaged speaker identification information for the associated segments of the plurality of segments for each unique identifier.

10. The method of claim 1, further comprising: outputting the final transcript in a fixed and tangible format.

11. A system for transcript generation including ASR and diarization, the system comprising:
- a platform module;
- a speech service module in communication with the platform module;
- a diarization module in communication with the platform module, wherein the platform module, the speech service module, and speech service module configured to
- receive an audio file at the platform module;
- divide the audio file into a plurality of chunks;
- send each instance of the plurality of chunks to the speech service module;
- convert speech to text for each instance of the plurality of chunks;
- return the text for each instance of the plurality of chunks to the platform module;
- merge the text for each instance of the plurality of chunks at the platform module to yield an audio file transcript;
- send the audio file and the plurality of chunks to the diarization module;
- perform first pass diarization on the plurality of chunks to yield a plurality of diarized chunks;
- perform second pass diarization on the plurality of diarized chunks and the audio file to yield a diarized audio file;
- merge the audio file transcript and the diarized audio file to yield a final transcript.

12. The system of claim 11, wherein the speech service module, and speech service module configured to transcode the audio file to a known codec.

13. The method of claim 11, further comprising a post process module, wherein the post process module, the speech service module, and speech service module configured to send the audio file transcript to a post process module; and apply punctuation and casing to the audio file transcript.

14. The system of claim 1, wherein the plurality of diarized chunks includes a plurality of segments, each with speaker identification information.

15. The system of claim 14, wherein the speaker identification information is an I-vector.

16. The system of claim 14, wherein in each of the plurality of diarized chunks, segments of the plurality of segments which include statistically similar speaker identification information are clustered as belonging to a corresponding speaker of a plurality of speakers.

17. The system of claim 16, wherein the second pass diarization includes giving each of the plurality of speakers for each of the plurality of diarized chunks a unique identifier.

18. The system of claim 17, wherein the second pass diarization includes, for associated segments of the plurality of segments for each unique identifier, averaging the speaker identification information of the associated segments to yield averaged speaker identification information.

19. The system of claim 18, wherein the second pass diarization includes, assigning identified segments of the plurality of segments from all of the plurality of chunks a final speaker based on correlation between the averaged speaker identification information for the associated segments of the plurality of segments for each unique identifier.

20. A fixed tangible medium, which when executed by a computing system, executes steps comprising:
- receiving an audio file at a platform module;
- dividing the audio file into a plurality of chunks;
- sending each instance of the plurality of chunks to a speech service module;
- converting speech to text for each instance of the plurality of chunks;
- returning the text for each instance of the plurality of chunks to the platform module;
- merging the text for each instance of the plurality of chunks at the platform module to yield an audio file transcript;
- sending the audio file and the plurality of chunks to a diarization module;
- performing first pass diarization on the plurality of chunks to yield a plurality of diarized chunks;
- performing second pass diarization on the plurality of diarized chunks and the audio file to yield a diarized audio file;
- merging the audio file transcript and the diarized audio file to yield a final transcript.

\* \* \* \* \*